US006002559A

United States Patent [19]
Meyer

[11] Patent Number: 6,002,559
[45] Date of Patent: *Dec. 14, 1999

[54] CONTRACTOR TIP CLEANING CIRCUIT

[75] Inventor: Brian N. Meyer, Salem, Va.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,234

[22] Filed: Jan. 30, 1998

[51] Int. Cl.$^{6}$ .......... H02H 3/00

[52] U.S. Cl. .......... 361/6; 307/137

[58] Field of Search .......... 361/2–6, 8, 13, 361/17; 307/125, 127, 137, 138

[56] References Cited

U.S. PATENT DOCUMENTS 2,817,774 12/1957 Kniel et al. .......... 307/137
3,029,351 4/1962 Akmenkalns .......... 307/137
3,092,739 6/1963 Lode .......... 307/137
4,011,464 3/1977 Robbi .......... 307/137
4,851,707 7/1989 Lindsay .......... 307/137
5,502,609 3/1996 Thomas et al. .......... 361/6

*Primary Examiner*—Ronald W. Leja
*Attorney, Agent, or Firm*—Welsh & Katz, Ltd.; Wayne O. Traynham

[57] ABSTRACT

A circuit for a direct current electric motor system for reducing contamination in contactor tips includes a semiconductor element in a parallel circuit arrangement with the contactor. The motor system includes a direct current power source coupled to an electric motor through the contactor. A capacitor is coupled in a parallel circuit arrangement with the motor. When the contactor is open, the capacitor is charged by the direct current power source through the semiconductor element. The capacitor will not charge to the same voltage as the direct current power source because of the semiconductor element, creating a voltage differential across the open contactor tips, which is equivalent to the voltage drop across the semiconductor element. Accordingly, the surge of current flowing across the contactor when its is closed cleans the contactor tips.

22 Claims, 1 Drawing Sheet

CONTRACTOR TIP CLEANING CIRCUIT

FIELD OF THE INVENTION

The present invention relates to electrical contactors and, more particularly, to a method and apparatus for reducing oxide contamination on contactor tips used in power switching applications.

BACKGROUND OF THE INVENTION

There are numerous applications in which electrical contactors are used to isolate an electrical circuit from an electrical power source. In many of these applications, the contactor is operated in what is sometimes referred to as a "dry-switching" mode, i.e. in a mode in which no current is drawn through the contactor tips at the time of opening or closing. For example, it is common to use a key switch controlled contactor in electrical vehicles to isolate the battery from the electric traction motor and the associated control when the key switch is turned to an off position.

While there are advantages to operating a contactor in a dry switching mode, such as, for example, to extend contactor tip life by eliminating arcing, there is also a significant disadvantage. In particular, contactor tips are typically produced from a silver based metal and will form a surface oxide or sulfide, which have poor electrical conductivity and act as an electrical insulator at the tips. In some instances, the oxide or sulfide build-up may accumulate sufficiently to block current flow to the electrical system while a lesser accumulation may reduce available power to the system.

One method of avoiding oxide and sulfide build-up is to construct contactors in which the tips exhibit a wiping action during operation, i.e., a moving tip that rubs across a surface of a stationary tip to wipe the oxide from the tip. A disadvantage of such contactors is their relatively high cost in comparison to conventional contactors.

In U.S. Pat. No. 5,502,609, an electrical circuit for preventing contactor tip contamination is shown. The circuit shown utilizes an electromagnetic coil to actuate the contactor by drawing current from a capacitor bank which is in parallel connection to the voltage source. The voltage difference between the contactor tips when closing is related to the amount of current which has been discharged by the capacitor. This circuit relies directly on the capacitor discharge to create a voltage difference between the contactor tips. Due to the reliance on capacitors, the voltage difference between the contactor tips will vary with parameters, such as the temperature of the circuit components, the discharge rate, the capacitance, and the resistance of the actuating coil through which the capacitor discharges.

Accordingly, it is desirable to provide a means for preventing oxide and sulfide build-up on contactor tips which does not require special contactors, and which provides a relatively constant and predictable voltage difference across the contactor tips.

SUMMARY OF THE INVENTION

It is therefore desirable to provide an apparatus and method for assuring contact closure with controlled current to prevent dry-switching, and an apparatus and method for closing contacts with a predictable voltage differential between the contactor tips.

In an illustrative form, the invention includes a contactor control system for a DC electric motor power system for reducing contactor tip contamination from dry-switching. The power system includes a DC power source coupled to a motor through a normally open line contactor, an electronic motor controller coupled in circuit with the motor, and a line capacitor coupled in parallel circuit arrangement with the motor and controller. The contactor control system includes at least one diode, or other similar semiconductor element, connected in parallel circuit arrangement with the contactor.

When the contactor is open, the line capacitor is charged by the DC power source through the diode. As the capacitor charges to a voltage near the value of the DC power source, the diode will stop conducting current to the capacitor, thereby charging the capacitor to a predictable voltage less than that of the power source. When the contactor tips are closed, the voltage difference between the contactor tips causes a small surge of current to flow across the tips. For a better understanding of the present invention, reference may be had to the following detailed description taken in conjunction with the accompanying drawings.

DETAILED DESCRIPTION OF THE INVENTION

Figure 1:
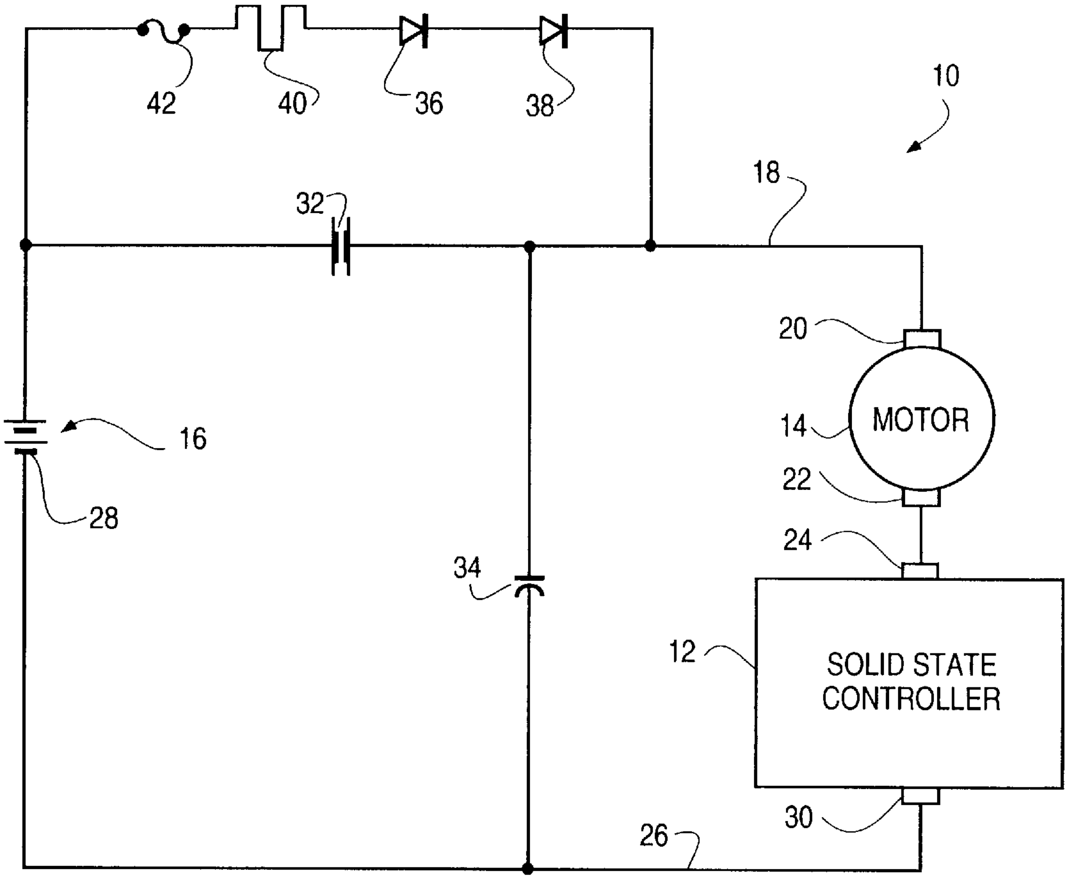
FIG. 1 is a simplified schematic drawing of a motor power system incorporating a specific embodiment of the present invention.

Referring to FIG. 1, there is shown an exemplary form of an electrical power control system 10 incorporating an embodiment of the apparatus and method of the present invention. The power control system 10 includes a solid state controller 12, which may include a conventional pulse-width modulating (PWM) controller of a type well known in the art, coupled in circuit with a direct current (DC) electric drive motor 14. Electric power is supplied from a DC source 16, illustrated as a battery in this embodiment.

As will be apparent, the controller 12 is intended to represent all of the elements of a power control system 10 necessary to control the operation of the motor 14. In this regard, the controller block 12 encompasses a regulated power supply, a speed control (and accelerator, if used) and suitable control logic for regulating motor operation. In a typical application, such as in a small truck or an electric golf cart, a key switch is turned, which would activate the power control system 10.

Power to the motor 14 is provided through a bus 18, which connects the DC source 16 to one terminal 20 of the motor 14. A second terminal 22 of the motor 14 is connected to a power control terminal 24 of the controller 12. The system 10 also includes a negative power bus 26 connected from a negative terminal 28 of the DC source 16 to a return terminal 30 of the controller 12. The electrical power control system 10 also includes a line contactor 32 connected in series along the bus 18 between the DC source 16 and the motor 14. A capacitor 34 is connected in parallel circuit arrangement with the motor 14 and the controller 12.

The system 10 further includes semiconductor elements, diodes 36 and 38, and a positive temperature coefficient (PTC) resistor 40. The diodes 36 and 38 and the resistor 40 are serially connected. A fuse 42 may also be added in series connection to the combination of the diodes 36 and 38 and the resistor 40 as a precaution against excessive current flow rates. The combination of the resistor 40 and diodes 36 and 38 is connected in across the line contactor 32 in a parallel circuit arrangement.

Figure 2:
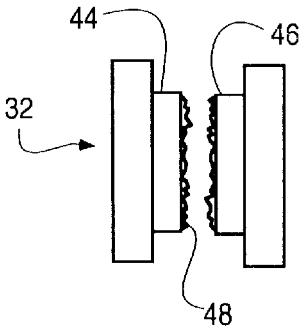
FIG. 2 is an enlarged side elevational view of contactor tips showing oxide build-up.

Referring to FIG. 2, the contactor 32 includes a pair of contact tips 44 and 46 which, when brought together into contact tip closure, provide a current path from the DC source 16 to the bus 18. If the contact tips 44 and 46 were operated in a "dry-switching" mode, i.e., with no current flowing through the contactor 32 at closing, the tips 44 and 46 tend to oxidize and form a surface layer 48 of an oxide or sulfide compound which has high electrical resistivity. Such an oxide build-up reduces the power available to bus 18 and may eventually prevent current flow through the contactor 32.

When the electrical power control system 10 is activated, the contactor 32 is normally open. The capacitor 34 is charged by the DC source 16 through the fuse 42, the resistor 40 and the diodes 36 and 38. No current flows through the motor 14 because the controller 12 is in an "off" state. As the voltage across the capacitor 34 approaches the voltage across the DC source 16, the diodes 36 and 38 stop conducting current. Accordingly, the voltage across the capacitor 34 will always be less than the voltage across the DC source 16 by an amount equal to the forward voltage drop across the diodes 36 and 38 when the contactor 32 is open. The voltage difference will depend directly on the number of diodes which are used. Typically, each diode 36 and 38 in serial connection will provide a known voltage drop across the contactor tips 44 and 46. Accordingly, the number of diodes used can be varied depending on the desired voltage differential across the contactor 32. An advantage of using diodes to create the voltage differential is that the voltage differential created by a diode is relatively predictable, since semiconductor devices have known threshold voltages below which they will not conduct.

When the contactor tips 44 and 46 are closed, current will briefly surge across the contactor tips 44 and 46, thereby cleaning the tips 44 and 46. Generally, it is desirable to have a sufficient voltage differential across the contactor tips 44 and 46 so that a small spark occurs when the contactor 32 is closed. The spark enhances cleaning of the tips 44 and 46.

I claim:

1. A circuit for a direct current electric motor system for reducing contamination in a contactor having contactor tips, the direct current electric motor system including a direct current power source coupled to a motor through the contactor, and a capacitor coupled in a parallel circuit arrangement with the motor, the circuit comprising, in combination:

at least one semiconductor element connected in parallel circuit arrangement with the contactor, said semiconductor element configured to provide a substantially constant and repeatable voltage differential between the power source and the capacitor;

said voltage differential appearing across the contactor causing cleaning of the contactor tips upon application of power.

2. The circuit as described in claim 1 wherein said at least one semiconductor element is a diode.

3. The circuit as described in claim 1 further comprising a resistive element connected in series connection with said at least one semiconductor element, the series arrangement of said at least one semiconductor element and said resistive element in a parallel circuit arrangement with the contactor.

4. The circuit as described in claim 3 wherein said resistive element is resistor.

5. The circuit as described in claim 3 wherein said resistive element is a positive temperature coefficient resistor.

6. The circuit as described in claim 3 further comprising a fuse connected in series with said at least one semiconductor element and said resistive element, the series arrangement of said fuse, said at least one semiconductor element and said resistive element, in a parallel circuit arrangement with the contactor.

7. A circuit for a direct current electric motor system for reducing contamination in a contactor having contactor tips, the direct current electric motor system including a direct current power source coupled to a motor through the contactor, and a capacitor coupled in a parallel circuit arrangement with the motor, the circuit comprising, in combination:

semiconducting means connected in parallel circuit arrangement with the contactor, said semiconducting means for providing current to the capacitor when the contactor is open such that a substantially constant and repeatable voltage differential exists between the power source and the capacitor; and said voltage differential across the contactor facilitating cleaning of the contactor.

8. The circuit as described in claim 7 further comprising a resistive means connected in series connection with said semiconducting means, for providing resistivity between the power source and the capacitor, the series arrangement of said semiconducting means and said resistive means, arranged in a parallel circuit arrangement with the contactor.

9. The circuit as described in claim 7 wherein said semiconducting means is at least one diode.

10. The circuit as described in claim 8 wherein said resistive means is a resistor.

11. The circuit as described in claim 8 wherein said resistive means is a positive temperature coefficient resistor.

12. The circuit as described in claim 8 further comprising a fuse connected in series with said semiconducting means and said resistive means, the series arrangement of said fuse, said semiconducting means and said resistive means, in a parallel circuit arrangement with the contactor.

13. A method for preventing contamination in a contactor having at least one pair of normally open contactor tips configured to couple a direct current power source to an electric load, the method comprising:

coupling a capacitor in a parallel circuit arrangement with the load;

connecting at least one diode in parallel circuit arrangement with the contactor;

charging said capacitor while the contactor tips are open with current from the direct current power source through said at least one diode, the diode configured to provide a substantially constant and repeatable voltage differential between the power source and the capacitor, said voltage differential appearing across the contactor; and closing the contactor, permitting a current surge across the contactor tips to effect cleaning thereof.

14. The method of claim 13 further comprising the step of coupling a resistive element in a series circuit arrangement with said diode, the series arrangement of said diode and said resistive element in a parallel circuit arrangement with the contactor.

15. The method of claim 14 further comprising the step of coupling a fuse in a series circuit arrangement with said diode and said resistive element, the series arrangement of said fuse, said diode, and said resistive element in a parallel circuit arrangement with the contactor.

16. The method of claim 14 further comprising the step of monitoring the voltage across said capacitor prior to closing the contactor.

17. A direct current motor system comprising, in combination:

a direct current power source;

an electric motor;

a contactor having contactor tips, said contactor connected between said direct current power source and said electric motor;

a capacitor coupled in parallel circuit arrangement with said electric motor; and at least one semiconductor element connected in parallel circuit arrangement with said contactor, said at least one semiconductor element configured to provide a substantially constant and repeatable voltage differential between the power source and the capacitor;

said voltage differential appearing across the contactor causing cleaning of the contactor tips upon application of power.

18. The motor system as described in claim 17 wherein said at least one semiconductor element is a diode.

19. The motor system as described in claim 17 further comprising a resistive element connected in series connection with said at least one semiconductor element, the series arrangement of said at least one semiconductor element and said resistive element in a parallel circuit arrangement with said contactor.

20. The motor system as described in claim 19 wherein said resistive element is resistor.

21. The motor system as described in claim 19 wherein said resistive element is a positive temperature coefficient resistor.

22. The motor system as described in claim 19 further comprising a fuse connected in series with said at least one semiconductor element and said resistive element, the series arrangement of said fuse, said at least one semiconductor element and said resistive element, in a parallel circuit arrangement with said contactor.

* * * * *